United States Patent [19]

Ouska

[11] 4,054,623
[45] Oct. 18, 1977

[54] COOLING SYSTEM

[76] Inventor: Michael Ouska, 1025 Newberry, La Grange Park, Ill. 60525

[21] Appl. No.: 616,315

[22] Filed: Sept. 24, 1975

[51] Int. Cl.² .................................................. B01F 3/04
[52] U.S. Cl. ........................................ 261/151; 165/60;
165/65; 165/DIG. 1; 261/DIG. 11
[58] Field of Search ........ 261/151, DIG. 9, DIG. 11, 261/22, 23 R, DIG. 75, 21, 36 R, 111, 112, 110; 165/60, 65, 61, 66, DIG. 1

[56] References Cited

U.S. PATENT DOCUMENTS

| 612,383 | 10/1898 | Dean | 261/DIG. 11 |
| 1,564,075 | 12/1925 | Lakin | 261/151 X |
| 1,659,408 | 2/1928 | Nicholls | 261/DIG. 11 |
| 2,276,970 | 3/1942 | Hibberd | 261/151 X |
| 2,355,828 | 8/1944 | Taylor | 261/151 X |
| 2,858,903 | 11/1958 | Goetz et al. | 261/22 X |
| 3,169,575 | 2/1965 | Engalitcheff, Jr. et al. | 261/151 X |
| 3,277,179 | 10/1966 | Sze | 261/22 X |
| 3,315,443 | 4/1967 | Marino | 261/DIG. 11 |
| 3,648,440 | 3/1972 | Egan | 261/36 R X |
| 3,826,742 | 7/1974 | Kirk et al. | 261/DIG. 75 |

Primary Examiner—Tim R. Miles
Assistant Examiner—Richard L. Chiesa
Attorney, Agent, or Firm—Robert L. Lindren; Edward D. Gilhooly; Davis Chin

[57] ABSTRACT

A cooling system for circulating a fluid past a heat-exchanger comprises a vertical surge column and a cooling tower to reduce the heat level of a circulating fluid for delivery to the surge column. The cooling tower is mounted on the surge column which is adapted to support substantially the entire weight of the cooling tower. Heat-exchanger coils are provided which are coupled to the surge column to receive the circulating fluid therefrom and to return the circulating fluid to the cooling tower. There is also provided a circulating device which is operatively coupled to the surge column, cooling tower, and heat-exchanger coils to circulate the circulating fluid therebetween.

9 Claims, 1 Drawing Figure

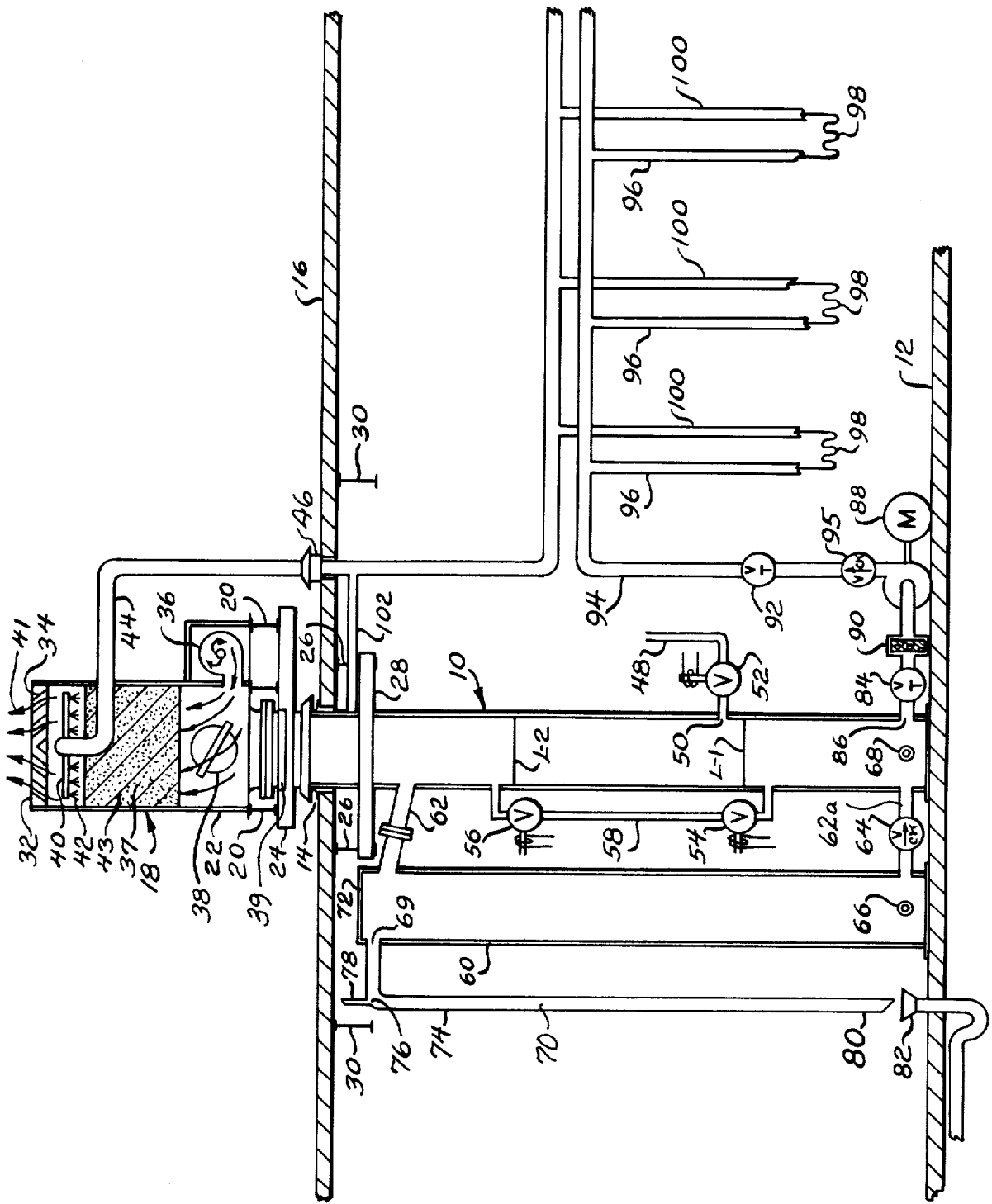

COOLING SYSTEM

BACKGROUND OF THE INVENTION

This invention relates generally to cooling systems for cooling factories, industrial plants and the like. More particularly, it relates to a cooling system which facilitates a cooling of liquid therein on a more efficient and economical basis.

More specifically, the invention pertains to new and novel improvements in systems and apparatus for cooling a heated fluid circulating therein, which results from the heat dissipated in manufacturing processes and equipments, in chemical processes, and in other industrial machines and devices. As is generally known, cooling systems, particularly in industrial applications, are very expensive in their construction and operation, and require continual maintenance. Some of the reasons for this is that the water consumption and power requirements in such cooling systems are extremely high. Another contributing factor to the high cost of such systems results from the large amount of labor and time needed to install such devices into industrial plants. Many of the prior art cooling systems also require relatively large areas within a plant thus reducing the usable production space to decrease productivity or increasing the overall size of a given industrial building.

Heretofore, one common cooling system in the industrial environment utilizes a cooling tower mounted on top of the roof of the factory or plant. This prior art cooling system suffers from the disadvantage in that it requires additional structure and reinforcement of the roof to support the heavy water tower. In addition, this system requires a large sump tank or reservoir coupled to the water tower in order to store a large quantity of water needed for cooling.

Such types of prior art cooling systems require a large primary tank utilized for storing and circulating the cooling fluid which must be built and assembled inside of the industrial plant and which occupies an undesirably and uneconomically large amount of interior space of the plant. Additionally, the primary tank generally includes an open or uncovered top wherein the cooling fluid is susceptible to contamination by dirt, debris, and other foreign particles from the surrounding environment or air.

Another disadvantage is due to the fact that the installation of many prior art cooling systems require a large amount of time and thereby increasing the labor costs. Therefore, it is desirable to provide a cooling system for industrial applications which reduce the complexity and cost of installation and operation of such devices and reduces the size of such equipment with improved effectiveness of cooling.

SUMMARY OF THE INVENTION

Accordingly, it is an object of the present invention to provide a cooling system which overcomes each and every one of the disadvantages encountered heretofore.

Another object of the present invention is to provide a cooling system which cools the liquid therein on a more efficient and economical basis.

Another object of the present invention is to provide a cooling system which is relatively simple to build and easy to operate and maintain.

Still another object of the present invention is to provide a cooling system which is exceedingly compact and occupies a lesser amount of space than the devices known heretofore.

Yet another object of the present invention is to provide a cooling system wherein a vertical stand column formed internally of the plant gives sturdy structural support to the cooling tower, thereby eliminating the need for structural means externally of the plant.

Yet still another object of the present invention is to provide a cooling system of a substantially closed type wherein the water is rendered more free of contamination from dirt, debris and other foreign particles.

In accordance with these aims and objectives, the present invention is concerned with the provision of a cooling system for circulating a fluid past a heat-exchanger which includes a vertical surge column and cooling means to reduce the heat level of a circulating fluid for delivery to the surge column. The cooling means is mounted on the surge column which is adapted to support substantially the entire weight of the cooling means. Heat-exchanger means are provided and are coupled to the surge column to receive the circulating fluid therefrom and to return the circulating fluid to the cooling means. There is also provided a circulating device which is operatively coupled to the surge column, cooling means, and heat-exchanger means to circulate the circulating fluid therebetween.

Additionally, a second vertical surge column is operably connected in a parallel relationship to the first vertical surge column via a one-way check valve in order to receive any overflow of water therefrom.

The present invention is particularly efficient and economical in cooling a circulating fluid in industrial plants, factories or the like since the cost of construction, operation, and maintenance has been greatly reduced. As an aid to reducing the cost, the instant cooling system is relatively simple to build and occupies a smaller amount of space than the known prior art devices.

Further, a vertical surge column of the invention effectively serves as a substantial sole support of the cooling means thereby eliminating the need for additional structure and reinforcement of the roof to support the cooling means thereabove as encountered in the prior art devices, Moreover, the invention does not suffer from contamination by dirt, debris, and other foreign particles from the surrounding environment or air as experienced in the generally open-type cooling systems. Therefore, the new and novel cooling system described in the application overcomes many of the above-mentioned problems of the prior art cooling apparatus and allows efficient and economical cooling of a circulating fluid therein.

BRIEF DESCRIPTION OF THE DRAWINGS

These and other objects and advantages of the present invention will become more fully apparent from the following detailed description when read in conjunction with the accompanying drawing in which there is shown a schematic diagram of the apparatus for carrying out the cooling process of the instant invention.

DETAILED DESCRIPTION OF THE PREFERRED EMBODIMENT

It is to be distinctly understood at the outset that the present invention shown in association with a cooling system is not intended to serve as a limitation upon the scope or teachings thereof, but is merely for the purpose of convenience of illustration of one example of its application. The present invention has numerous applications in other field and apparatus since the invention pertains to a system for cooling of a liquid therein on a more efficient and economical basis.

Referring now in detail to the drawing of the particular illustration, there is shown a cooling system having a vertical supply mains or surge column 10 such as a stand pipe and the like mounted on a floor or support surface 12 of an industrial plant, factory, or the like. In one embodiment of the invention, it is found that the surge column can be approximately 30 inches in diameter, although the invention is not to be so limited. In accordance with the invention, a top portion 14 of the surge column 10 extends through roof 16 of the industrial plant and supports externally a substantial amount of the weight of cooling tower 18 which is of any conventional design. I-beams 20 or any other suitable structures are used to aid in supporting the cooling tower, the I-beams being disposed between the base or bottom portion 22 of the cooling tower 18 and a first support means such as a flange 24 coupled to the stand pipe 10. I-beams 26 or any other suitably adapted structures are utilized to support the roof 16 and are mounted between a second support means and the roof 16. The second support means comprises a flange 28 coupled to the surge column 10. Bar joists 30 of conventional design further support the roof at different locations throughout the plant as is well-known in the art.

Although the teachings of the invention can be utilized with any suitable cooling tower of generally well-known constructions, the tower 18 is merely illustrative of one type of cooling means. The cooling tower 18 is closed in its top portion by a cover 32 having louvers 34 built therein for expelling gases into the atmosphere. There is provided in the bottom portion 22 of the cooling tower 18 a centrifugal squirrel cage blower 36 for directing a draft of cooling air upwardly through the cooling tower. In the intermediate section of the cooling tower, there is disposed a layer of heat-removal material 37 of a conventional and commercially available type. Adjacent the blower 36, there is provided a manhole 38 for ease of access to facilitate the changing and cleaning of the heat-removal material. An unremovable grate or screen 39 is welded or otherwise conveniently mounted to the surge column before the erection thereof. The grate 39 prevents the accidental dropping of tools or other materials down the surge column during opening of the manhole 38 for maintenance purposes. The grate is also a safety device that protects the operator from falling into the surge column when performing repair and maintenance.

The cooling tower 18 in this illustrated example includes spraying means comprising of branch arms 40 and spray heads or nozzles 42 which communicate with the interior thereof above the heat-removal material 37. The liquid to be cooled communicates with the spraying heads 42 so that the liquid is sprayed onto the heat-removal material in heat-exchange therewith in the interior of the cooling tower for reducing the heat level thereof. The gases or cooling air blown upwardly by the blower 36 through the heat-removal material 37 is heated by the transverse flow of the liquid to be cooled. The resultant heated air or stream 41 is expelled into the atmosphere via the louvers 34 in the cover 32. The downwardly flow of the cold liquid falling under gravity is passed into the surge column 10.

In certain applications, it is to be understood that the heat-removal material 37 can be replaced by or supplemented with a plurality of slanted corrugated sheets 43 arranged diagonally in the intermediate section to extend the flow path of the liquid to be cooled so as to increase the total surface area as it falls under gravity to facilitate the heat-exchange process thereof. This can be accomplished in any conventional manner, as is well-known in the art.

A conduit or return mains 44 communicates into the interior of the cooling tower through an opening (not shown) therein. The liquid to be cooled is introduced into the cooling tower by this return main. The return main extends through the roof 16 by way of an opening 46 therein.

Circulating fluid such as city make-up water is fed into the vertical supply mains 10 by way of a conduit or pipe 48 through inlet opening 50 which conducts cold water into the supply mains. A solenoid-operated valve 52 controls the flow of water into the supply mains. The valve 52 is actuated electrically by a low water cut-in float-switch or valve 54 and a high level cut-out float-switch or valve 56, the electrical interconnection being omitted for the sake of clarity to the drawing. The float-switches or valves 54 and 56 regulate and monitor the level of water in the surge column 10 permitting introduction of additional circulating water when required by opening and closing the solenoid-operated valve 52. When the water in the supply mains falls below level L-1, the solenoid-operated valve 52 is opened and allows the city make-up water to be fed into the supply mains. The level of the water in the supply mains increases until it reaches the level L-2, upon which time the valve 52 is then closed.

In steady-state operating conditions, the level of the water in conduit 58 between the float-switches 54 and 56 will follow the level of the water in the surge column 10. The differential between the levels L-1 and L-2 define the operating range in the surge column 10.

A second vertical stand pipe or surge column 60 is mounted on the floor 12 and spaced apart in a parallel relationship to the surge column 10. In one application of the invention, the second vertical stand pipe can be also approximately thirty inches in diameter. The second vertical stand pipe 69 is utilized to receive any overflow of water from the surge column 10. A conduit 62 couples the top right-hand side of the second vertical stand pipe 60 to the surge column 10. The conduit 62 is sloped angularly towards the surge column 10 so that any water that is initially entered therein will drain back into the surge column 10. The bottom of the stand pipe 60 is connected to the bottom of the surge column 10 via a conduit 62a having a one-way check valve 64 which allows the water to flow only in one direction from the stand pipe 60 into the surge column 10.

The bottom of the stand pipe 60 is provided with an opening or aperture 66 for facilitating the cleaning thereof. Similarly, the bottom of the surge column 10 is also provided with cleaning opening or aperture 68. The top left-hand side of the stand pipe 60 is connected via opening 69 to an overflow conduit 70 which receives any excess water collected in the stand pipe 60. The top of the stand pipe 60 is closed by a plate 72 which is welded or otherwise suitably mounted thereon. At the end 74 of the overflow conduit 70, there is provided an opening 76 which connects to a vent or conduit 78. The vent or conduit 78 permits any water vapor collected in the overflow conduit 70 to be distributed to the atmosphere. Adjacent the other end 80 of the conduit 70, a drain trap pipe 82 is disposed for carrying out the excess water to a sewer system (not-shown).

A butterfly valve 84 of the wafer type connects the bottom of the surge column 10 via opening 86 to the suction end of a centrifugal pump and motor 88 for circulating the water therefrom and for returning the water to the cooling tower 18. A strainer 90 is arranged between the butterfly valve 84 and the suction end of the pump and motor 88 to filter out any debris, dirt or other foreign particles. Upstream of the discharge end of the pump, a second butterfly valve 92 of the wafer type is provided to throttle or regulate the water flow through the pump and conduit 94.

A one-way check valve 95 is disposed between the discharge end of the pump and the butterfly valve 92 to allow the water to flow only in one direction and to prevent the water from backing up into the pump when the system is inoperative. The two butterfly valves 84 and 92 can be closed to isolate the pump from the system during its inoperation to facilitate emptying and cleaning of the strainer 90.

The conduit 98 is connected to a plurality of branch pipes 96, each pipe 96 being coupled to one side of a heat-exchanger coil 94. The heat-exchanger coil 98 represents the load or heat generated by the machines and other devices operating in the industrial plant which must be removed or cooled by the cooling system. The other sides of the heat-exchanger coils 98 are connected to a plurality of branch pipes 100 which returns the heated water to the cooling tower via the return mains 44. It should be noted that any number of branch pipes 96, 100 and heat-exchanger coils 98 dependent upon the industrial plant requirements can be connected between the conduit 94 and the return mains 44. For the purposes of simplicity in illustration and discussion, only three such sets of pipes and coils are depicted in the drawing.

As the heated water is delivered to the cooling tower 18, a small portion of this water is sent directly to the surge column 10 via a leakage path or conduit 102. The leakage path also serves to prevent freezing of the water in the cooling tower during cold weather and when the cooling system is not in operation as is conventional and well-known in the art.

On the initial start-up for operation of the system, the centrifugal pump and motor is turned on and operates continuously as the city make-up water is fed into the supply mains 10. The city make-up water is circulated through the conduit 94, branch pipes 96, heat-exchanger coils 98, branch pipes 100, and return mains 44 to the cooling tower 18 in order to fill up the system. The low water cut-in float-switch 54 will keep the valve 52 open and allow the water to be continuously fed into the surge column 10 until the level of the water in the conduit 58 and the surge column 10 reaches the level L-2. At such time, the high water cut-out float-switch 56 is actuated to close the valve 52 and prevent further entry of the city make-up water into the surge column 10. Within a short time thereafter, the heated water returned to the cooling tower 18 is cooled as the gas or steam is expelled into the atmosphere. The cooled water in the form of liquid water drops falls under gravity through the cooling tower and into the top of the surge column 10. As the water is continuously circulated from the surge column 10 to the cooling tower 18, more and more gas or steam will be expelled into the atmosphere, leaving the level of the water in the surge column 10 and conduit 58 to drop gradually to the level L-1. Then, the low water cut-in float-switch 54 will again be actuated to open the valve 52 to allow water to be fed into the surge column 10 and conduit 58. This continues until the level L-2 is reached when the high water cut-out float-switch shuts off the valve 52. In steady-state operating conditions, this cycle will occur repeatedly.

When the cooling system is turned off after this initial start-up, the water present in the cooling tower will slowly fill up the surge column 10 beyond the level L-2 and up to the conduit 62. As the water continues to rise, the additional water will eventually pass through the conduit 62 and into the second surge column 60. Any overflow of water that should exist in the surge column 60 will be sent out the sewer system via conduit 70 and drain trap pipe 82. Any water vapor in the conduit 70 will be extinguished into the atmosphere via conduit 78.

As the cooling system is turned back on, the water in the surge column 10 and conduit 58 will cycle between the levels L-1 and L-2 as described above. However, in addition the excess water in the second surge column 60 will be transferred gradually through the one-way check valve 64 into the first surge column 10 when the pressure in the surge columns 60 is greater than the pressure in the surge column 10. This operation is defined to function as a one-way U-tube or manometer. Thus, the level of the water in the second surge column 60 will also follow substantially the level of the water in the surge column 10. Otherwise, there is no difference in the steady-state operating condition earlier described.

From the foregoing description of the cooling system embodying the present invention, it can be seen that there is provided an improved cooling system of the closed type which cools the liquid therein on a more efficient and economical basis. Further, the first vertical surge column formed internally of the plant supports substantially the entire weight of the cooling tower externally of the plant, thereby eliminating the need for structural means external to the plant. The cooling system of the present invention is relatively simple to build and easy to operate and maintain.

While there has been illustrated and described what is at present to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as a best mode contemplated for carrying out this invention, but that the invention will include all embodiments falling within the scope of the appended claims.

What is claimed is:

1. A cooling system for circulating a fluid through a heat exchanger comprising:
   a primary vertical surge column to receive fluid to be circulated and deliver the fluid to a heat exchanger;
   an auxiliary vertical surge column being positioned in substantially parallel relationship to said primary column;
   a first conduit coupling said primary column to said auxiliary column at upper levels thereof to supply fluid to said auxiliary column when the fluid level in said primary column reaches said upper level;

a second conduit coupling said primary column to said auxiliary column at lower levels thereof;

said second conduit including control means solely permitting flow from said auxiliary column to said primary column when the level of fluid in said auxiliary column exceeds the level of fluid in said primary column;

cooling means adapted to be coupled to a heat exchanger means to reduce the heat level of a circulating fluid;

said cooling means being in fluid communication with said primary column to supply circulating fluid thereto, said cooling means being mounted on top of said primary column for sole support of said cooling means, a fluid distributor located in an upper section of said cooling means for passing said circulating fluid downwardly, an air blower located in a lower section of said cooling means for passing cooling air upwardly, corrugated fluid-air contact sheets located in a middle section between said fluid distributor and said air blower for providing a contact surface area for contacting said downwardly flowing circulating fluid and said upwardly flowing cooling air, and circulating means operatively coupled to the primary column to deliver circulating fluid to a heat exchanger and return the fluid to said cooling means.

2. A cooling system as claimed in claim 1, further comprising supply means operatively communicating with said primary and surge column for delivering additional fluid to the interior thereof.

3. A cooling system as claimed in claim 2, further comprising regulating means and monitoring means operatively coupled to said supply means for controlling the level of the circulating fluid in said primary surge columm.

4. A cooling system as claimed in claim 3, wherein said regulating and monitoring means are located at a first predetermined level on said primary surge column and a second predetermined level on said surge column between said lower level and below said upper level.

5. A cooling system as claimed in claim 4, wherein said regulating and monitoring means activates said supply means to deliver additional fluid to said primary column when the fluid level therein reaches said first predetermined position, and wherein said regulating and monitoring means deactivates said supply means when the fluid level reaches said second predetermined position.

6. A cooling system as claimed in claim 1, wherein said first and conduit is sloped angularly towards said primary surge column.

7. A cooling system as claimed in claim 1, wherein said control means is a one-way check valve.

8. A cooling system as claimed in claim 1, further comprising an overflow conduit connected to one end of said auxilliary surge column to remove any excess water therefrom.

9. A cooling system as claimed in claim 8, further comprising a vent connected to said overflow conduit to extinguish any water vapor therein to the atmosphere.

* * * * *